United States Patent
Ishiyama

(10) Patent No.: US 11,577,639 B2
(45) Date of Patent: Feb. 14, 2023

(54) LIGHTING DEVICE FOR VEHICLE

(71) Applicant: TOYOTA JIDOSHA KABUSHIKI KAISHA, Toyota Aichi-ken (JP)

(72) Inventor: Yuichi Ishiyama, Okazaki Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

(21) Appl. No.: 17/673,338

(22) Filed: Feb. 16, 2022

(65) Prior Publication Data

US 2022/0266743 A1 Aug. 25, 2022

(30) Foreign Application Priority Data

Feb. 19, 2021 (JP) .............................. JP2021-024953

(51) Int. Cl.
*B60Q 1/08* (2006.01)
*B60Q 1/14* (2006.01)
*H05B 47/105* (2020.01)

(52) U.S. Cl.
CPC .............. *B60Q 1/085* (2013.01); *B60Q 1/143* (2013.01); *H05B 47/105* (2020.01)

(58) Field of Classification Search
CPC .... B60Q 1/085; B60Q 1/143; H05B 45/3578; H05B 47/105; Y02B 20/40
See application file for complete search history.

(56) References Cited

U.S. PATENT DOCUMENTS

| | | | | |
|---|---|---|---|---|
| 2015/0042225 | A1* | 2/2015 | Fukayama | B60Q 1/143 315/82 |
| 2016/0250964 | A1* | 9/2016 | Takagaki | B60Q 1/08 362/466 |
| 2019/0001868 | A1* | 1/2019 | Kaino | B60Q 1/143 |
| 2019/0359121 | A1 | 11/2019 | Shimada | |
| 2022/0338327 | A1* | 10/2022 | Mochizuki | G02B 19/0076 |

FOREIGN PATENT DOCUMENTS

| | | |
|---|---|---|
| EP | 2574502 A1 | 4/2013 |
| JP | 2008-037240 A | 2/2008 |
| JP | 2008-114800 A | 5/2008 |
| JP | 2009-123566 A | 6/2009 |
| JP | 2013/077451 A | 4/2013 |
| JP | 6744424 B2 | 8/2020 |
| WO | 2018/096619 A1 | 5/2018 |

* cited by examiner

*Primary Examiner* — Raymond R Chai
(74) *Attorney, Agent, or Firm* — Dinsmore & Shohl LLP

(57) ABSTRACT

A lighting device for a vehicle controls an emission intensity of each of a plurality of light emission units. The lighting device is configured to execute first control of controlling an irradiation area in accordance with a traveling direction of a vehicle, second control of controlling the irradiation area so that a degree of irradiation of light to a position of an object is reduced, and third control of controlling the irradiation area so that the degree of irradiation of the light to a position of a reflection object is reduced. The lighting device selects, as a final target value, a minimum value of a target value of an emission intensity for the first control, a target value of an emission intensity for the second control, and a target value of an emission intensity for the third control.

3 Claims, 15 Drawing Sheets

|  | 23L-1 | 23L-2 | 23L-3 | 23L-4 | 23L-5 | 23L-6 |
|---|---|---|---|---|---|---|
| FIRST TARGET VALUE tcd1 | 45 | 50 | 70 | 80 | 100 | 100 |

FIG.6

|  | 23L-1 | 23L-2 | 23L-3 | 23L-4 | 23L-5 | 23L-6 |
|---|---|---|---|---|---|---|
| SECOND TARGET VALUE tcd2 | 100 | 100 | 100 | 80 | 20 | 0 |

FIG.8

|  | 23L-1 | 23L-2 | 23L-3 | 23L-4 | 23L-5 | 23L-6 |
|---|---|---|---|---|---|---|
| THIRD TARGET VALUE tcd3 | 40 | 50 | 80 | 100 | 100 | 100 |

FIG.11

|  | FIRST CONTROL | SECOND CONTROL | THIRD CONTROL |  |
|---|---|---|---|---|
| FIRST SITUATION | ○ | ○ | ○ | tcdf-m ← Min (tcd1-m, tcd2-m, tcd3-m) |
| SECOND SITUATION | ○ | × | ○ | tcdf-m ← Min (tcd1-m, tcd3-m) |
| THIRD SITUATION | ○ | ○ | × | tcdf-m ← tcd2-m |
| FOURTH SITUATION | ○ | × | × | tcdf-m ← tcd1-m |

FIG.13

LIGHTING DEVICE FOR VEHICLE

CROSS-REFERENCE TO RELATED APPLICATION

This application claims priority to Japanese Patent Application No. 2021-024953 filed on Feb. 19, 2021, the content of which is hereby incorporated by reference in its entirety into this application.

BACKGROUND

1. Technical Field

The present disclosure relates to a lighting device for controlling a plurality of light emission units mounted in a front part of a vehicle.

2. Description of the Related Art

Hitherto, there has been known a lighting device for controlling a plurality of light emission units (light source units) mounted in a front part of a vehicle (for example, Japanese Patent No. 6744424). This lighting device executes a light distribution control of changing an irradiation area of light irradiated from the plurality of light emission units.

As an example of the light distribution control, there are known a first control of controlling an irradiation area of light in accordance with a traveling direction of the vehicle, a second control of controlling the irradiation area of the light so as not to irradiate positions of a preceding vehicle and an oncoming vehicle with the light, and a third control of controlling the irradiation area of the light in accordance with a position of an object which reflects the light. Hereinafter, the object reflecting the light will be referred to as "reflection object"

Incidentally, the inventor of this application is considering development of a vehicle capable of executing, as the light distribution control, all of the first control, the second control, and the third control. However, in such a vehicle, those three types of control interfere with one another, and, as a result, there is a possibility that an appropriate irradiation area cannot be formed forward of an own vehicle. For example, when (i) a preceding vehicle and a reflection object exist forward of the vehicle, (ii) the preceding vehicle and the reflection object exist at the same side of the own vehicle, and (iii) the third control is prioritized over the second control, the irradiation area of the light is formed to include the preceding vehicle. As a result, there is a possibility that a driver of the preceding vehicle may sense glare (may be dazzled).

SUMMARY

In view of the above, an object of the present disclosure is to provide a lighting device for a vehicle which executes the first control, the second control, and the third control and can form an appropriate irradiation area forward of the own vehicle.

According to the present disclosure, a lighting device for a vehicle comprises light emission units, a first sensor, a second sensor, and an electronic control unit. The light emission units is mounted in a front part of the vehicle and is aligned in a predetermined direction. The first sensor is configured to acquire travel state information being information on a travel state of the vehicle. The second sensor is configured to acquire vehicle periphery information including information on an object existing in a peripheral region of the vehicle. The electronic control unit is configured to execute a light distribution control of controlling an emission intensity of each of the light emission units to change an irradiation area formed of light irradiated from the light emission units.

Further, the light distribution control includes a first control, a second control, and a third control. The first control is a control of controlling the irradiation area in accordance with a traveling direction of the vehicle determined based on the travel state information. The second control is a control of controlling the irradiation area to reduce a degree of irradiation of the light to a position of an object detected based on the vehicle periphery information. The third control is a control of controlling the irradiation area to reduce the degree of irradiation of the light to a position of a reflection object detected based on the vehicle periphery information.

Furthermore, the electronic control unit is configured to select a final target value of the emission intensity from among a first target value being a target value of the emission intensity for executing the first control, a second target value being the target value of the emission intensity for executing the second control, and a third target value being the target value of the emission intensity for executing the third control. Furthermore, the electronic control unit is configured to control the light emission units based on the final target value.

Furthermore, the electronic control unit is configured to select, as the final target value, a minimum value of the first target value, the second target value, and the third target value when a current situation is a first situation in which all of the first control, the second control, and the third control are to be executed.

The lighting device having the above-mentioned configuration can cause, in the vehicle capable of executing the first control, the second control, and the third control, each of the light emission units to irradiate light at an appropriate emission intensity, to thereby form an appropriate irradiation area forward of the vehicle.

For example, when a preceding vehicle and a reflection object exist forward of the vehicle, and the preceding vehicle and the reflection object exist at the same side of the own vehicle, the lighting device according to the present disclosure selects, as the final target value, the minimum value of the first target value, the second target value, and the third target value. As a result, an amount of the light irradiated toward the preceding vehicle is reduced. Thus, the lighting device according to the present disclosure can reduce a possibility that a driver of the preceding vehicle may sense glare.

According to an aspect of the present disclosure, the electronic control unit may be configured to select, as the final target value, a smaller value of the first target value and the third target value when the current situation is a second situation in which only the first control and the third control are to be executed.

For example, when the reflection object exists in a traveling direction of the vehicle, the lighting device according to the present disclosure selects, as the final target value, the smaller value of the first target value and the third target value. As a result, the amount of the light irradiated toward the reflection object is reduced. Thus, the amount of light reflected by the reflection object is consequently reduced (or, the light is not reflected by the reflection object). Thus, the lighting device according to the present disclosure can reduce the possibility that the driver of the vehicle may sense glare.

According to another aspect of the present disclosure, the vehicle periphery information may include image data on the peripheral region. In this aspect, in the third control, when a brightness value of a pixel on the image data is equal to or greater than a predetermined brightness threshold value, the electronic control unit may be configured to determine that the reflection object exists at a position corresponding to the pixel.

In one or more embodiments, the above-mentioned electronic control unit may be implemented by a microprocessor programmed to execute one or more functions described herein. In one or more embodiments, the electronic control unit may be implemented entirely or partially by hardware formed of an integrated circuit specialized for one or more applications, namely, for example, an ASIC. Elements of the present disclosure are not limited to elements of embodiments and modified examples of the present disclosure described with reference to the drawings. The other objects, features and accompanied advantages of the present disclosure can be easily understood from the embodiments and the modified examples of the present disclosure.

BRIEF DESCRIPTION OF THE DRAWINGS

FIG. 6 is a table which shows a first target value of each of the light emission units of the left high beam light.

FIG. 8 is a view which shows a table showing a second target value of each of the light emission units of the left high beam light.

FIG. 11 is a view which shows a table showing a third target value of each of the light emission units of the left high beam light.

FIG. 13 is a view which shows a table showing a method of determining a final target value in each of the first situation, the second situation, the third situation, and a fourth situation.

DESCRIPTION OF THE EMBODIMENTS

<Configuration>

Figure 1:
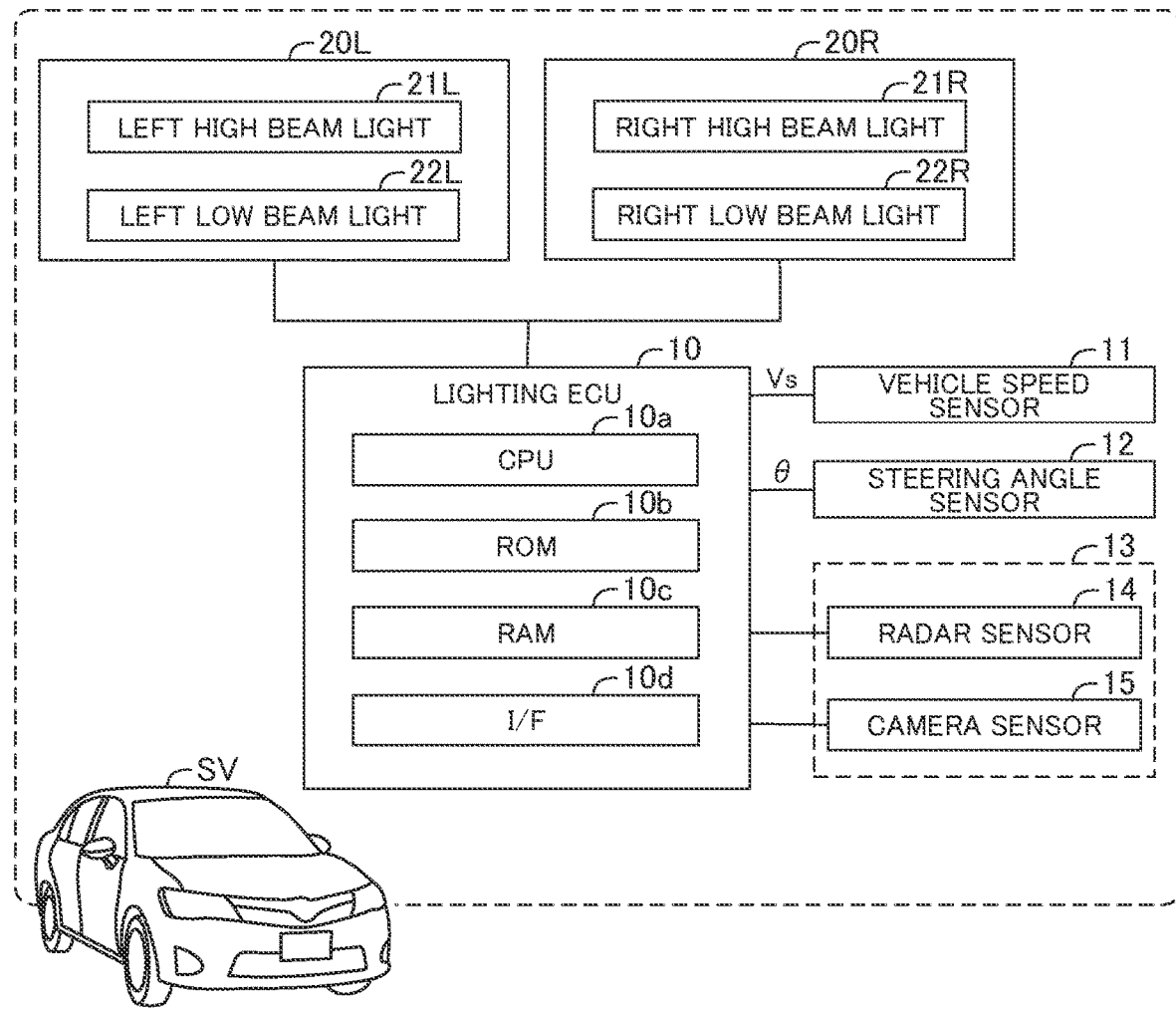
FIG. 1 is a schematic view which illustrates a configuration of a lighting device for a vehicle according to one or more embodiments of the present disclosure.

As illustrated in FIG. 1, a lighting device according to one or more embodiments of the present disclosure is mounted on a vehicle SV. The lighting device includes a lighting ECU 10. An ECU is an electronic control unit which includes a microcomputer as a main part. The microcomputer includes a CPU, a ROM, a RAM, and an interface (I/F). For example, the lighting ECU 10 includes a microcomputer which includes a CPU 10a, a ROM 10b, a RAM 10c, and an interface (I/F) 10d. The CPU 10a is configured to execute instructions (programs and routines) stored in the ROM 10b to implement various functions described below.

The vehicle SV includes various ECUs for executing vehicle control (for example, an engine ECU and a brake ECU), but the ECUs are not directly relevant to the lighting device according to the one or more embodiments. Descriptions thereof are therefore omitted.

The lighting ECU 10 is electrically connected to a left headlight 20L and a right headlight 20R. The lighting ECU 10 can control each of the left headlight 20L and the right headlight 20R separately.

Figure 2:
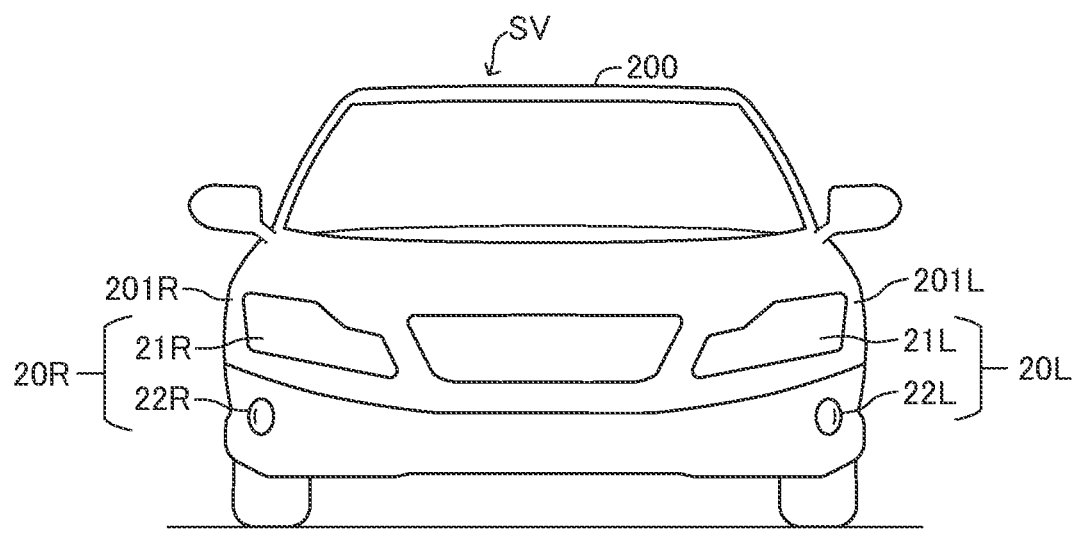
FIG. 2 is a front view of a vehicle which illustrates arrangement of a left headlight and a right headlight.

As illustrated in FIG. 2, the left headlight 20L is provided on a left side of a front part (a left front corner portion 201L) of a body 200 of the vehicle SV, and the right headlight 20R is provided on a right side of the front part (a right front corner portion 201R) of the body 200 of the vehicle SV. The left headlight 20L and the right headlight 20R have the same basic configuration. The left headlight 20L includes a left high beam light 21L and a left low beam light 22L. The right headlight 20R includes a right high beam light 21R and a right low beam light 22R.

With reference again to FIG. 1, the lighting ECU 10 is electrically connected to sensors listed below, and is configured to receive a detection signal or an output signal from each of the sensors.

A vehicle speed sensor 11 detects a speed (travel speed) of the vehicle SV, and outputs a signal indicating a vehicle speed Vs. A steering angle sensor 12 detects a steering angle of the vehicle SV, and outputs a signal indicating a steering angle $\theta$ (deg). The steering angle $\theta$ is zero in a situation in which the vehicle SV is traveling straight. The steering angle $\theta$ is a positive value when the vehicle SV turns left, and the steering angle $\theta$ is a negative value when the vehicle SV turns right.

Information on travel states of the vehicle SV output from the sensors 11 and 12 will be also referred to as "travel state information." The vehicle SV may further include sensors for acquiring other travel state information (for example, a yaw rate and an acceleration value of the vehicle SV).

A periphery sensor 13 is configured to acquire information on objects existing in a peripheral region of the vehicle SV. The peripheral region of the vehicle SV includes at least a forward region of the vehicle SV. The object includes a moving object, for example, a four-wheeled vehicle, a two-wheeled vehicle, and a pedestrian, and a fixed object, for example, a utility pole, a tree, and a guard rail. The periphery sensor 13 includes a radar sensor 14 and a camera sensor 15.

The radar sensor 14 irradiates a radio wave (hereinafter referred to as "millimeter wave") in the millimeter wave band to the peripheral region of the vehicle SV, and receives the millimeter wave (that is, a reflected wave) reflected by an object existing in an irradiation range. The radar sensor 14 detects the object based on reflected wave information. The reflected wave information includes a phase difference between the transmitted millimeter wave and the received reflected wave, an attenuation level of the reflected wave, and a period from the transmission of the millimeter wave to the reception of the reflected wave. Further, the radar sensor 14 calculates parameters indicating a relative relationship between the vehicle and the object based on the reflected wave information. The parameters indicating the relative relationship between the vehicle SV and the object include an orientation (or position) of the object with respect to the vehicle SV, a distance between the vehicle SV and the object, and a relative speed between the vehicle SV and the object.

The camera sensor 15 captures an image of the peripheral region of the vehicle SV to acquire image data. The camera sensor 15 may determine presence or absence of an object based on the image data, and may calculate the parameters indicating the relative relationship between the vehicle and the object.

The information on an object (including the parameters indicating the relative relationship between the vehicle and the object) acquired from the periphery sensor 13 is referred to as "object information." The lighting ECU 10 acquires, as vehicle periphery information, information on the peripheral region of the vehicle SV including the object information and the image data.

<Configuration of High Beam Lights>

Figure 3:
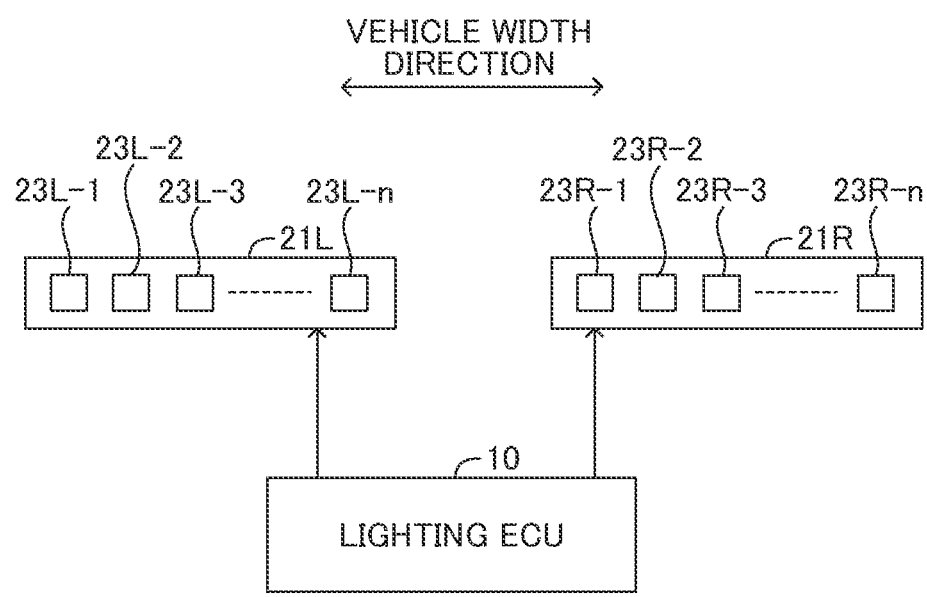
FIG. 3 is a diagram which illustrates a configuration of a left high beam light and a right high beam light.

The left high beam light 21L and the right high beam light 21R are each configured to irradiate space in front of the vehicle with light (a high beam). As illustrated in FIG. 3, the left high beam light 21L includes a plurality of (n) light emission units (23L-1, 23L-2, 23L-3, . . . , 23L-n) aligned in a vehicle width direction (a left-right direction of the vehicle SV). The right high beam light 21R includes a plurality of (n) light emission units (23R-1, 23R-2, 23R-3, . . . , 23R-n) aligned in the vehicle width direction.

The number "n" of the light emission units is, for example, 12. For the convenience of simple illustration and description, an example of "n=6" will be described below.

The left high beam light 21L and the right high beam light 21R have the same configuration, and the configuration of the left high beam light 21L is accordingly described below. The light emission units in the left high beam light 21L will be hereinafter collectively referred to as "light emission units 23L."

Figure 4:
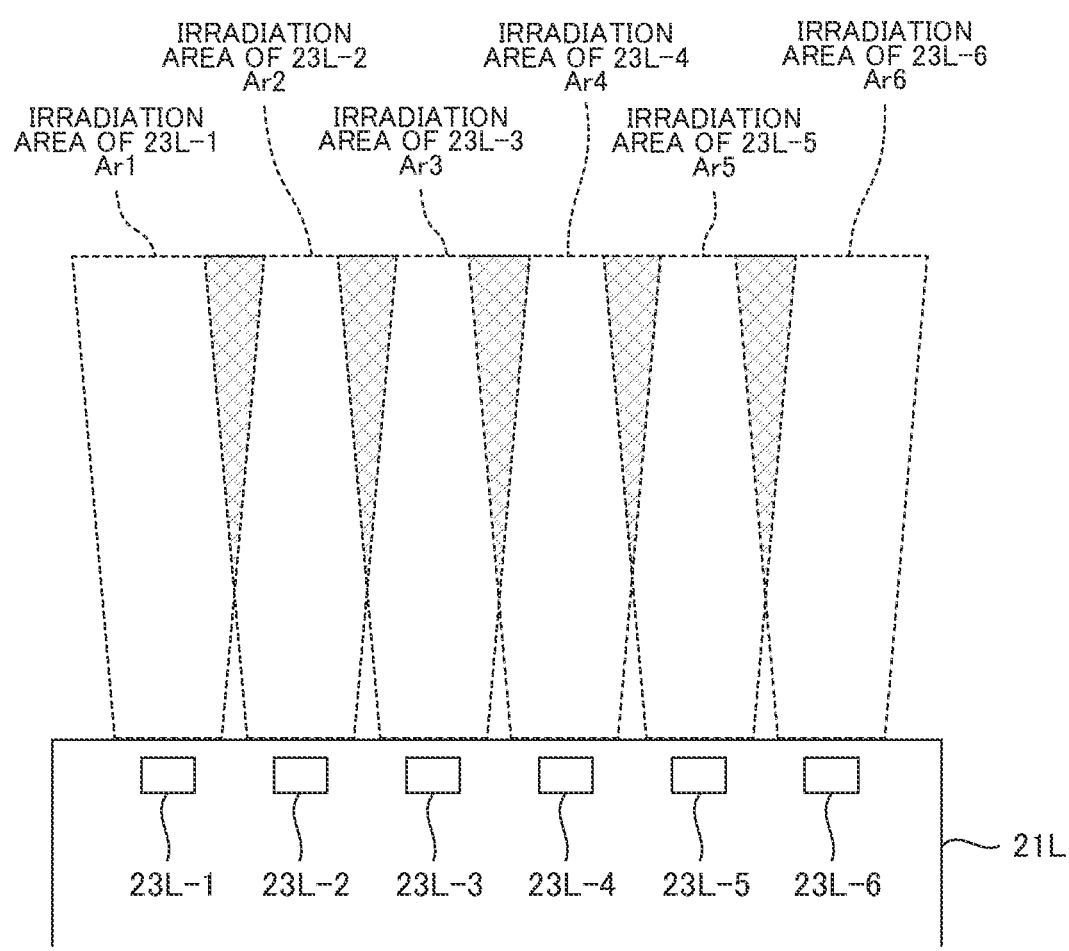
FIG. 4 is a view which illustrates an irradiation area of each of light emission units of the left high beam light.

The light emission units 23L each include a white light emitting diode (LED). FIG. 4 illustrates an irradiation area of each of the light emission units 23L. The irradiation areas of the light emission units 23L-1 to 23L-6 are denoted by Ar1 to Ar6, respectively. The irradiation areas of the light emission units 23L overlap each other between the areas adjacent to each other in the vehicle width direction. An entire irradiation area formed of the irradiation areas Ar1 to Ar6 will be hereinafter denoted by reference symbol "Ara".

The lighting ECU 10 can control a lit state of each of the light emission units 23L independently of one another. That is, the lighting ECU 10 can selectively light one or more light emission units out of the light emission units 23L. The lighting ECU 10 can further control the emission intensity of each of the light emission units 23L by adjusting the amount of current supplied to each of the light emission units 23L.

Here, the "emission intensity" means the degree of brightness of light emitted in one direction. The emission intensity is, for example, luminous intensity (cd), which is the amount of luminous flux per unit solid angle (hereinafter referred to as "emission intensity cd").

As a technology of controlling each of the light emission units (LEDs) independently of one another, one of technologies described in, for example, Japanese Patent Application Laid-open No. 2009-123566, Japanese Patent Application Laid-open No. 2008-37240, and Japanese Patent Application Laid-open No. 2008-114800 may be employed.

<Light Distribution Control>

The lighting ECU 10 is configured to execute a light distribution control of changing the irradiation areas formed of the light from the light emission units 23L.

The light distribution control includes a first control, a second control, and a third control. The first control is a control of controlling the irradiation area of the light in accordance with the traveling direction of the vehicle SV determined based on the travel state information. The second control is a control of controlling the irradiation area of the light to reduce a degree of irradiation of the light to a position of an object (a preceding vehicle, an oncoming vehicle, and a pedestrian) detected based on the vehicle periphery information. The third control is a control of controlling the irradiation area of the light to reduce the degree of irradiation of the light to a position of a reflection object detected based on the vehicle periphery information. Each of the first control, the second control, and the third control is now described.

<First Control>

For example, in a situation in which the vehicle SV travels on a curve in the night, it is difficult for the driver to visually recognize a situation forward of the vehicle SV. Thus, the lighting ECU 10 executes the first control. The first control is a control of swiveling the irradiation area of the light, and is thus sometimes referred to as "swivel control." The swivel control itself is publicly known (for example, see Japanese Patent Application Laid-open No. 2013-77451). Thus, the first control is now briefly described.

The lighting ECU 10 determines a turning direction and a turning degree of the vehicle SV based on the travel state information (the steering angle θ and the speed Vs). The lighting ECU 10 calculates a traveling direction dr of the vehicle SV based on the turning direction and the turning degree of the vehicle SV. The traveling direction dr is a direction toward which the vehicle SV is predicted to travel. Thus, in a situation in which the vehicle SV is traveling on a right curve, the traveling direction dr is a right front direction of the vehicle SV. In a situation in which the vehicle SV is traveling on a left curve, the traveling direction dr is a left front direction of the vehicle SV. The lighting ECU 10 calculates a first target value tcd1 for each of the light emission units 23L based on the traveling direction dr of the vehicle SV. The first target value tcd1 is a target value of an emission intensity cd for executing the first control.

Figure 5:
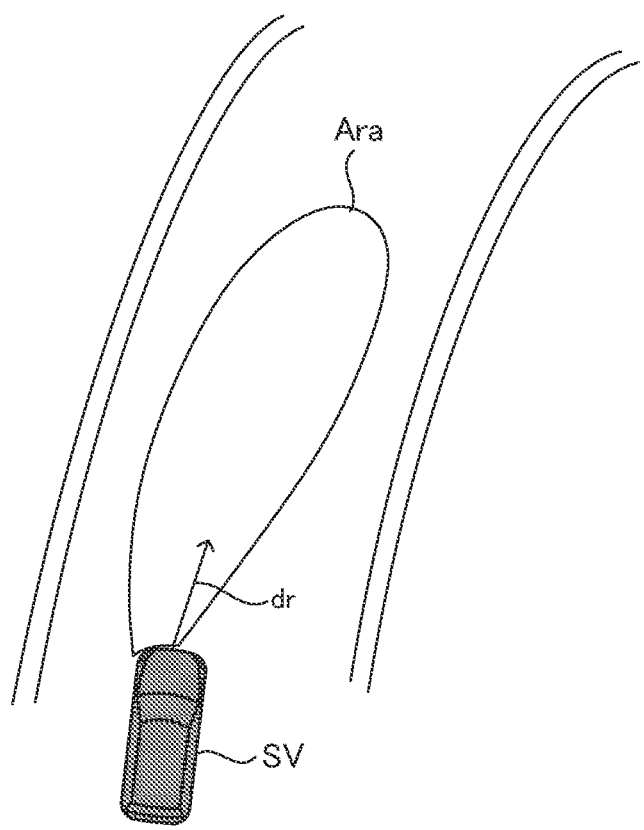
FIG. 5 is a view which illustrates a situation in which the vehicle travels on a right curve.

In an example of FIG. 5, the vehicle SV travels on the right curve. In this case, as shown in FIG. 6, the lighting ECU 10 calculates the first target value tcd1 of each of the light emission units 23L based on the traveling direction dr. In a table shown in FIG. 6, the first target value tcd1 of each of the light emission units 23L is normalized while the maximum value of the emission intensity cd is set to "100".

In the situation in which the vehicle SV travels on the right curve, the first target value tcd1 of the light emission unit 23L-6 on the turning direction side (right side) of the vehicle SV is the greatest. Meanwhile, the first target value tcd1 of the light emission unit 23L-1 on the opposite side (left side) of the turning direction of the vehicle SV is the smallest. Thus, the first target value tcd1 gradually decreases from the light emission unit 23L-6 on the rightmost side of the light emission units 23L toward the left direction. Thus, the degree of irradiation of the light to the right front region (region on the turning direction side) with respect to the vehicle SV is high. The degree of irradiation of the light to the left front region (region on the opposite side of the turning direction side) with respect to the vehicle SV is low.

The lighting ECU 10 controls the emission intensity cd of each of the light emission units 23L in accordance with the table shown in FIG. 6. As a result, as illustrated in FIG. 5, the irradiation area Ara of the light from the light emission units 23L is formed such that the light illuminates more the right front region of the vehicle SV than the left front region. As described above, the lighting ECU 10 can change the irradiation area Ara (can move the irradiation area Ara in the swiveling manner) in accordance with the traveling direction dr of the vehicle SV. As a result, it is possible to increase visibility on the right curve.

<Second Control>

For example, when a preceding vehicle exists forward of the vehicle SV in the night, and the vehicle SV irradiates the high beams forward, there is a possibility in that a driver of the preceding vehicle may sense glare. Thus, the lighting ECU 10 executes the second control. The second control is a control of forming, in a part of the region forward of the vehicle, an area (shaded area) to which the light is not irradiated, and is thus sometimes referred to as "shading control." The shading control itself is publicly known (for example, Japanese Patent Application Laid-open No. 2009-123566). Thus, the second control is now briefly described.

The lighting ECU 10 determines whether or not a predetermined moving object condition is satisfied based on the vehicle periphery information (specifically, the object information and/or the image data). The predetermined moving object condition is satisfied when a moving object (for example, a preceding vehicle, an oncoming vehicle, and a pedestrian) exists in a predetermined distance range forward of the vehicle SV. When the predetermined moving object condition is satisfied, the lighting ECU 10 identifies a position of the moving object. The lighting ECU 10 calculates a second target value tcd2 for each of the light emission units 23L based on the position of the moving object. The second target value tcd2 is a target value of the emission intensity cd for executing the second control.

Figure 7:
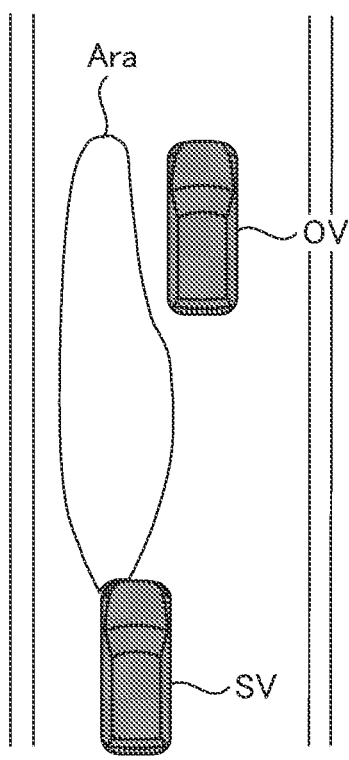
FIG. 7 is a view which illustrates a situation in which a preceding vehicle exists forward of the own vehicle.

In an example of FIG. 7, a preceding vehicle OV exists forward of the vehicle SV. In this case, as shown in FIG. 8, the lighting ECU 10 calculates the second target value tcd2 for each of the light emission units 23L.

For example, the light emission unit 23L-6 is the light emission unit for irradiating the position of the preceding vehicle OV. Thus, the second target value tcd2 of the light emission unit 23L-6 is "0". As described above with reference to FIG. 4, a part of the irradiation area Ar5 of the light emission unit 23L-5 adjacent to the light emission unit 23L-6 overlaps the irradiation area Ar6 of the light emission unit 23L-6. Thus, the second target value tcd2 of the light emission unit 23L-5 is a relatively small value. As a result, the degree of irradiation of the light to the position of the preceding vehicle OV is small. Meanwhile, the second target value tcd2 of each of the light emission units (23L-1 to 23L-4) other than the light emission units 23L-5 and 23L-6 is relatively great. Thus, the degree of irradiation of the light to the areas other than the position of the preceding vehicle OV is great.

As illustrated in FIG. 7, the irradiation area Ara of the light from the light emission units 23L is formed so as not to irradiate the position of the preceding vehicle OV. As described above, the lighting ECU 10 can reduce the degree of irradiation of the light to the position of the moving object (the preceding vehicle OV) forward of the vehicle SV. As a result, it is possible to reduce the possibility in that the driver of the preceding vehicle OV may sense glare.

<Third Control>

For example, when a reflection object (for example, a road sign) exists forward of the vehicle SV in the night, and the vehicle SV irradiates the high beams forward, there is a possibility in that the driver of the vehicle SV may sense glare due to the light reflected by the reflection object. Thus, the lighting ECU 10 executes the third control. The third control is a control of reducing the degree of irradiation of the light to the position of the reflection object, and is thus sometimes referred to as "dimming control."

The lighting ECU 10 determines whether or not a predetermined reflection object condition is satisfied based on the vehicle periphery information (specifically, the image data). The predetermined reflection object condition is satisfied when a reflection object exists forward of the vehicle SV. The reflection object reflects light, and hence brightness of a region corresponding to the reflection object on the image data tends to be high. In consideration of this tendency, the lighting ECU 10 determines whether or not the predetermined reflection object condition is satisfied as described below.

The lighting ECU 10 selects (extracts) a pixel having a brightness value higher than a predetermined brightness value ba by scanning the image data. The lighting ECU 10 sets an area including the selected pixel and a plurality of pixels existing around the selected pixel as "pixel-of-interest area."

In another example, the lighting ECU 10 may group a plurality of pixels that have brightness values higher than the predetermined brightness value ba and are adjacent to one another, and may set the grouped pixels as "pixel-of-interest area."

The lighting ECU 10 acquires a maximum brightness bmax in the pixel-of-interest area. When the maximum brightness bmax is equal to or higher than a predetermined brightness threshold value bth, the lighting ECU 10 determines that a reflection object exists in the pixel-of-interest area including the pixel having the maximum brightness bmax. That is, the lighting ECU 10 determines that the predetermined reflection object condition is satisfied.

Figure 9:
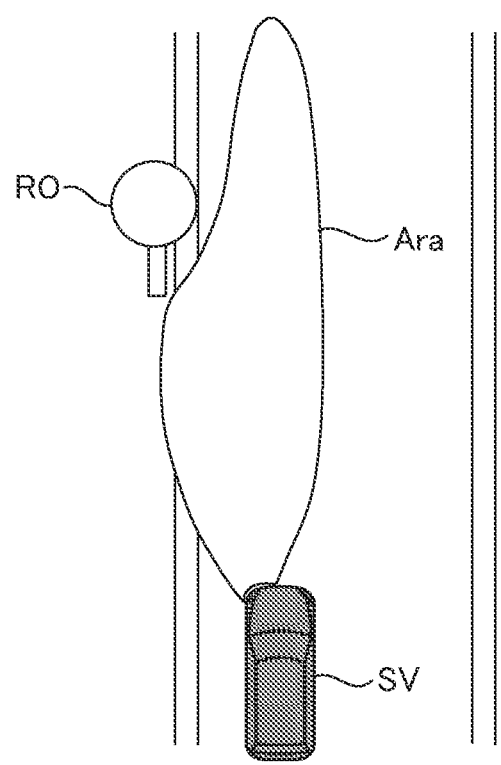
FIG. 9 is a view which illustrates a situation in which a reflection object exists forward of the own vehicle.
Figure 10:
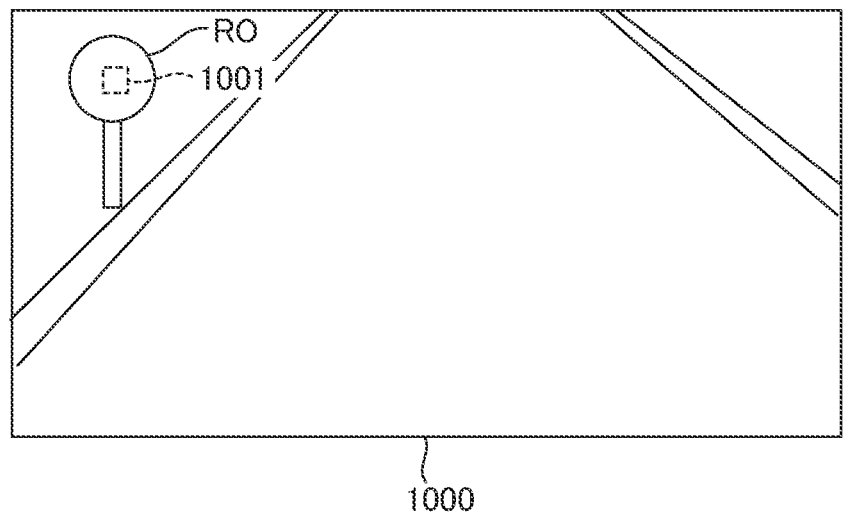
FIG. 10 is a view which shows image data acquired in the situation of FIG. 9.

In an example of FIG. 9, the vehicle SV travels near a reflection object (road sign) RO. In this situation, the lighting ECU 10 acquires image data 1000 shown in FIG. 10 from the periphery sensor 13 (specifically, the camera sensor 15). The lighting ECU 10 scans the image data 1000, to thereby determine a pixel-of-interest area 1001. The pixel-of-interest area 1001 is an area on the image data corresponding to a part of the reflection object RO. In this case, when the maximum brightness bmax in the pixel-of-interest area 1001 is equal to or higher than the brightness threshold value bth, the lighting ECU 10 determines that a reflection object exists in the pixel-of-interest area 1001. Thus, the lighting ECU 10 determines that the predetermined reflection object condition is satisfied.

When the predetermined reflection object condition is satisfied, the lighting ECU 10 calculates a third target value tcd3 for each of the light emission units 23L as shown in FIG. 11. The third target value tcd3 is a target value of the emission intensity cd for executing the third control.

The light emission unit 23L-1 is a light emission unit which irradiates the position of the pixel-of-interest area 1001 (that is, the reflection object RO). The third target value tcd3 of the light emission unit 23L-1 is a small value. Further, as illustrated in FIG. 4, a part of the irradiation area Ar2 of the light emission unit 23L-2 adjacent to the light emission unit 23L-1 overlaps the irradiation area Ar1 of the light emission unit 23L-1. Thus, the third target value tcd3 of the light emission unit 23L-2 is also a relatively small value. As a result, the degree of irradiation of the light to the position of the reflection object RO is small. Meanwhile, the third target values tcd3 of the light emission units (23L-3 to 23L-6) other than the light emission units 23L-1 and 23L-2 are relatively great. Thus, the degree of irradiation of the light to the regions other than the position of the reflection object RO is great.

As illustrated in FIG. 9, the irradiation area Ara of the light from the light emission units 23L is formed so as not to irradiate the position of the reflection object RO. As described above, the lighting ECU 10 can reduce the degree of irradiation of the light to the reflection object RO forward of the vehicle SV. As a result, it is possible to reduce the possibility in that the driver of the vehicle SV may sense glare.

<Configuration of Lighting ECU>

Figure 12:
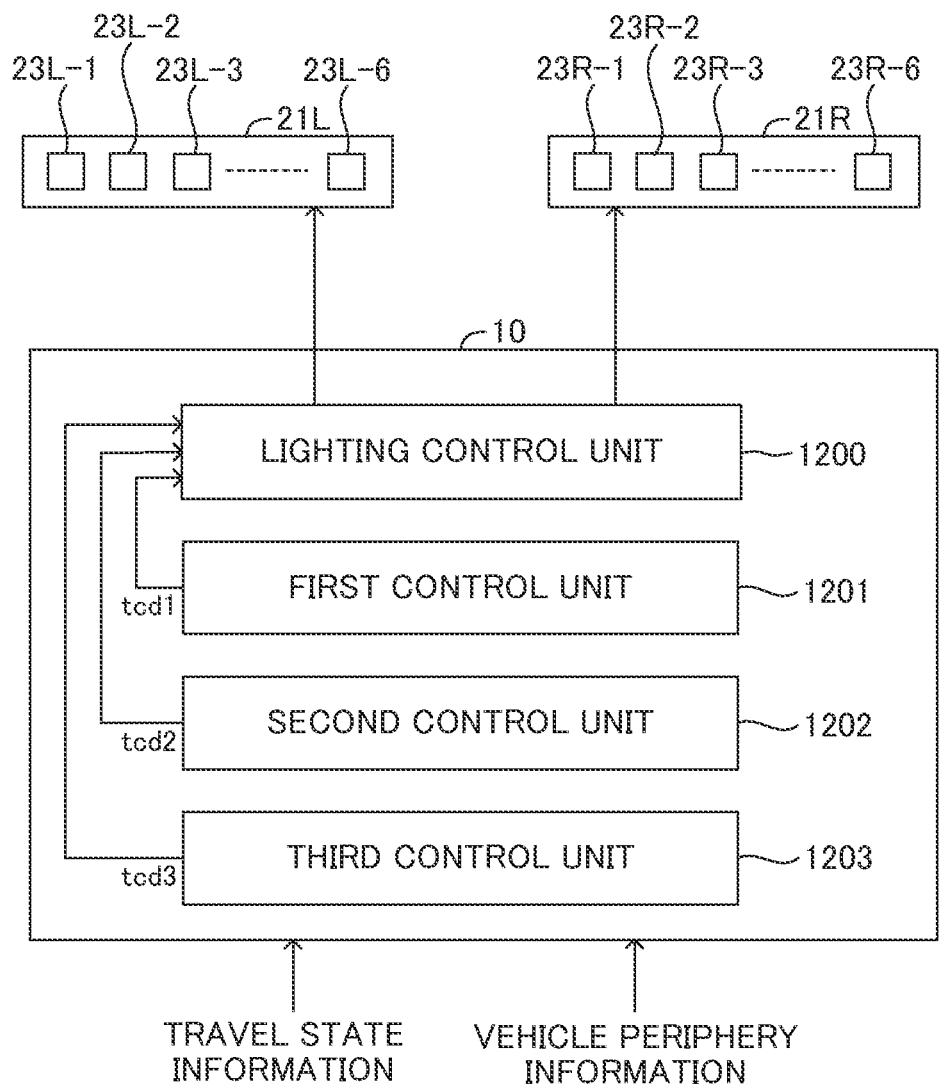
FIG. 12 is a functional block view of a lighting ECU.

In order to achieve the above-mentioned first control to third control, the lighting ECU 10 includes functional components shown in FIG. 12. Specifically, the lighting ECU 10 includes a lighting control unit 1200, a first control unit 1201, a second control unit 1202, and a third control unit 1203. Those components are implemented by combination of hardware (CPU 10a, RAM 10c, and the like) and software.

The first control unit 1201 executes processing relating to the first control. The first control unit 1201 calculates the traveling direction dr of the vehicle SV, and calculates the first target value tcd1 for each of the light emission units 23L each time a predetermined period dT elapses. The first control unit 1201 outputs the first target values tcd1 to the lighting control unit 1200.

The second control unit 1202 executes processing relating to the second control. The second control unit 1202 determines whether or not the predetermined moving object condition is satisfied each time the predetermined period dT elapses. When the predetermined moving object condition is satisfied, the second control unit 1202 calculates the second target value tcd2 for each of the light emission units 23L. After that, the second control unit 1202 outputs the second target values tcd2 to the lighting control unit 1200.

The third control unit 1203 executes processing relating to the third control. The third control unit 1203 determines whether or not the predetermined reflection object condition is satisfied each time the predetermined period dT elapses. When the predetermined reflection object condition is satisfied, the third control unit 1203 calculates the third target value tcd3 for each of the light emission units 23L. After that, the third control unit 1203 outputs the third target values tcd3 to the lighting control unit 1200.

When the lighting ECU 10 can execute all of the first control, the second control, and the third control, the following problems occur.

(a) For example, when a reflection object and another vehicle (the preceding vehicle or the oncoming vehicle) exist at the same side of the vehicle SV, and the third control is prioritized over the second control, the irradiation area of the light is formed so that the irradiation area includes the other vehicle. As a result, there is a possibility in that a driver of the other vehicle may sense glare.

(b) When a reflection object exists in a traveling direction of the vehicle SV, and the first control is prioritized over the third control, the light is irradiated to the position of the reflection object at a relatively high emission intensity. The light is reflected by the reflection object, and there is consequently a possibility in that the driver of the vehicle SV may sense glare.

Thus, the lighting control unit 1200 executes arbitration processing for the first control, the second control, and the third control such that the first control, the second control, and the third control do not exert adverse influence on one another.

Specifically, the lighting control unit 1200 receives the first target values tcd1 from the first control unit 1201 each time the predetermined period dT elapses. Further, the lighting control unit 1200 receives the second target values tcd2 from the second control unit 1202 each time the predetermined period dT elapses in a situation in which the predetermined moving object condition is satisfied (that is, a situation in which a moving object exists forward of the vehicle SV). Furthermore, the lighting control unit 1200 receives the third target values tcd3 from the third control unit 1203 each time the predetermined period dT elapses in a situation in which the predetermined reflection object condition is satisfied (that is, a situation in which a reflection object exists forward of the vehicle SV).

The lighting control unit 1200 determines a final target value tcdf for each of the light emission units 23L. The final target value tcdf is a final target value of the emission intensity cd. The lighting control unit 1200 selects the final target value tcdf from among the first target value tcd1, the second target value tcd2, and the third target value tcd3. After that, the lighting control unit 1200 controls the emission intensity cd of each of the light emission units 23L based on the final target value tcdf.

Any one light emission unit of the light emission units 23L will be hereinafter referred to as "light emission unit 23L-m" (m=1, . . . , 6). Further, the first target value tcd1 of the light emission unit 23L-m will be referred to as "tcd1-$m$." Furthermore, the second target value tcd2 of the light emission unit 23L-m will be referred to as "tcd2-$m$." Furthermore, the third target value tcd3 of the light emission unit 23L-m will be referred to as "tcd3-$m$." Furthermore, the final target value tcdf of the light emission unit 23L-m will be referred to as "tcdf-m."

The lighting control unit 1200 determines, each time the predetermined period dT elapses, which of a first situation to a fourth situation shown in FIG. 13 the current situation is. As shown in FIG. 13, the "first situation" is "a situation in which all of the first control, the second control, and the third control are to be executed." The "second situation" is "a situation in which only the first control and the third control are to be executed." The "third situation" is "a situation in which only the first control and the second control are to be executed." The "fourth situation" is "a situation in which only the first control is to be executed." Description is now given of an operation of the lighting control unit 1200 in each of the first situation to the fourth situation.

<First Situation>

At a certain point of time t1, the lighting control unit 1200 receives the first target value tcd1-$m$ from the first control unit 1201, receives the second target value tcd2-$m$ from the second control unit 1202, and receives the third target value tcd3-$m$ from the third control unit 1203. In this case, the lighting control unit 1200 determines that the current situation is the first situation. As shown in FIG. 13, the lighting control unit 1200 selects, as the final target value tcdf-m, the minimum value of the first target value tcd1-$m$, the second target value tcd2-$m$, and the third target value tcd3-$m$. A Min function shown in FIG. 13 is a function of selecting the minimum value of numerical values in parentheses. The lighting control unit 1200 controls the light emission unit 23L-m such that the emission intensity cd of the light emission unit 23L-m corresponds to the final target value tcdf-m.

<Second Situation>

At a certain point of time t2, the lighting control unit 1200 receives the first target value tcd1-*m* from the first control unit 1201 and receives the third target value tcd3-*m* from the third control unit 1203. At the point of time t2, the lighting control unit 1200 does not receive the second target value tcd2-*m* from the second control unit 1202. In this case, the lighting control unit 1200 determines that the current situation is the second situation. As shown in FIG. 13, the lighting control unit 1200 selects, as the final target value tcdf-m, a smaller value of the first target value tcd1-*m* and the third target value tcd3-*m*. The lighting control unit 1200 controls the light emission unit 23L-m such that the emission intensity cd of the light emission unit 23L-m corresponds to the final target value tcdf-m.

<Third Situation>

At a certain point of time t3, the lighting control unit 1200 receives the first target value tcd1-*m* from the first control unit 1201 and receives the second target value tcd2-*m* from the second control unit 1202. At the point of time t3, the lighting control unit 1200 does not receive the third target value tcd3-*m* from the third control unit 1203. In this case, the lighting control unit 1200 determines that the current situation is the third situation. As shown in FIG. 13, the lighting control unit 1200 selects the second target value tcd2-*m* as the final target value tcdf-m. As described above, in the third situation, the lighting control unit 1200 prioritizes the second control over the first control. The lighting control unit 1200 controls the light emission unit 23L-m such that the emission intensity cd of the light emission unit 23L-m corresponds to the final target value tcdf-m.

<Fourth Situation>

At a certain point of time t4, the lighting control unit 1200 receives the first target value tcd1-*m* from the first control unit 1201. At the point of time t4, the lighting control unit 1200 does not receive the second target value tcd2-*m* from the second control unit 1202, and does not receive the third target value tcd3-*m* from the third control unit 1203. In this case, the lighting control unit 1200 determines that the current situation is the fourth situation. As shown in FIG. 13, the lighting control unit 1200 selects the first target value tcd1-*m* as the final target value tcdf-m. The lighting control unit 1200 controls the light emission unit 23L-m such that the emission intensity cd of the light emission unit 23L-m corresponds to the final target value tcdf-m.

Figure 14:
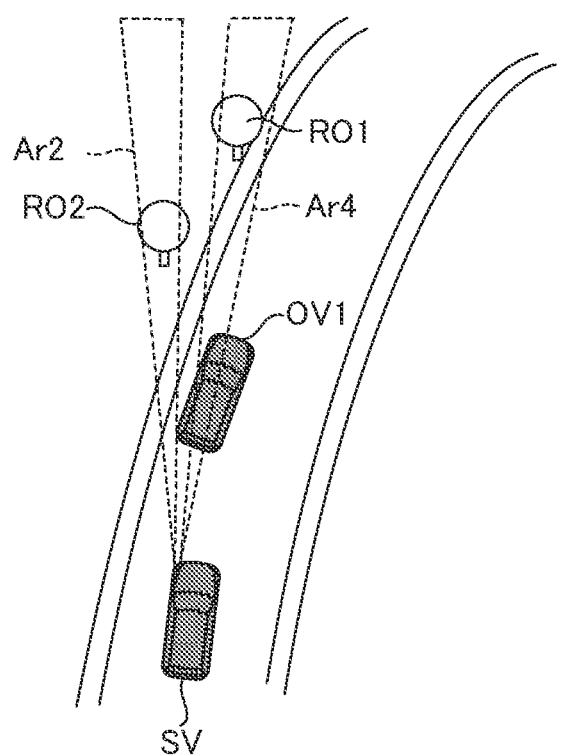
FIG. 14 is a view which illustrates an example of the first situation.

The lighting device having the above-mentioned configuration provides the following effects. In an example of FIG. 14, a first reflection object RO1, a second reflection RO2, and a first preceding vehicle OV1 exist forward of the vehicle SV. The first preceding vehicle OV1 and the first reflection object RO1 overlap the irradiation area Ar4 of the light emission unit 23L-4. The second reflection object RO2 overlaps the irradiation area Ar2 of the light emission unit 23L-2. In FIG. 14, the irradiation area Ar4 indicates an irradiation area at the time when the emission intensity cd of the light emission unit 23L-4 is set to the maximum value. The irradiation area Ar2 indicates an irradiation area at the time when the emission intensity cd of the light emission unit 23L-2 is set to the maximum value.

The lighting device determines that the current situation is the first situation. After that, the lighting device selects, as the final target value tcdf-4 of the light emission unit 23L-4, the minimum value of the first target value tcd1-4, the second target value tcd2-4, and the third target value tcd3-4. As described above, the lighting device prioritizes the target value of the light distribution control corresponding to the minimum value of the three target values (tcd1-4, tcd2-4, and tcd3-4). In this example, the first target value tcd1-4 is a relatively great value (for example, "80"). Further, the first preceding vehicle OV1 exists in the irradiation area Ar4 of the light emission unit 23L-4, and the second target value tcd2-4 is thus "0". Furthermore, the first reflection object RO1 exists in the irradiation area Ar4 of the light emission unit 23L-4, and the third target value tcd3-4 is thus a relatively small value (for example, "40"). Thus, the second target value tcd2-4 is the smallest of the three target values (tcd1-4, tcd2-4, and tcd3-4). The lighting device selects the second target value tcd2-4 as the final target value tcdf-4. In this case, the light emission unit 23L-4 does not substantially irradiate the light, and a driver of the first preceding vehicle OV1 does not thus sense glare.

Similarly, the lighting device selects, as the final target value tcdf-2 of the light emission unit 23L-2, the minimum value of the first target value tcd1-2, the second target value tcd2-2, and the third target value tcd3-2. In this example, the first target value tcd1-2 is a relatively great value (for example, "80"). Further, the first preceding vehicle OV1 does not exist in the irradiation area Ar2 of the light emission unit 23L-2, and the second target value tcd2-2 is thus also a relatively great value (for example, "80"). Meanwhile, the second reflection object RO2 exists in the irradiation area Ar2 of the light emission unit 23L-2, and the third target value tcd3-2 is thus a relatively small value (for example, "40"). Thus, the third target value tcd3-2 is the smallest of the three target values (tcd1-2, tcd2-2, and tcd3-2). The lighting device selects the third target value tcd3-2 as the final target value tcdf-2. In this case, the light emission unit 23L-2 irradiates the light at a relatively low emission intensity cd, and the light from the light emission unit 23L-2 does not thus reach the second reflection object RO2. The light from the light emission unit 23L-2 is not reflected by the second reflection object RO2, and the driver of the vehicle SV does not thus sense glare. As described above, the lighting device can cause each of the light emission units 23L to irradiate the light at an appropriate emission intensity cd, to thereby form an appropriate irradiation area forward of the vehicle SV.

Figure 15:
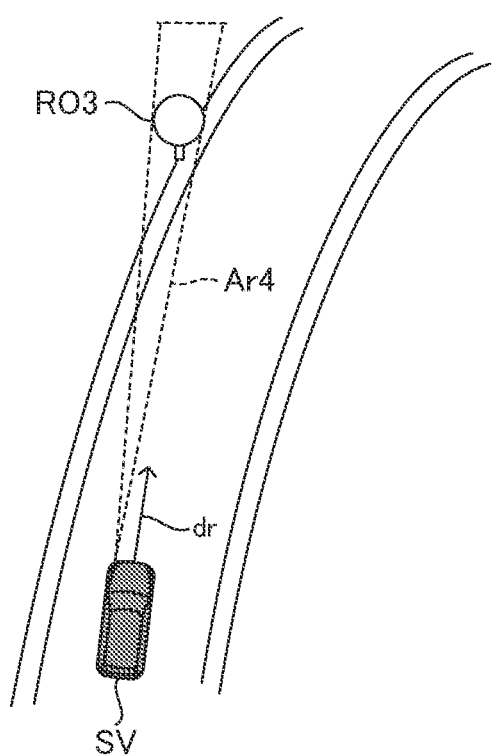
FIG. 15 is a view which illustrates an example of the second situation.

In an example of FIG. 15, a third reflection object RO3 exists forward of the vehicle SV, and exists on an extended line of the traveling direction dr of the vehicle SV. Further, the third reflection object RO3 overlaps the irradiation area Ar4 of the light emission unit 23L-4. In FIG. 15, the irradiation area Ar4 indicates an irradiation area at the time when the emission intensity cd of the light emission unit 23L-4 is set to the maximum value.

The lighting device determines that the current situation is the second situation. After that, the lighting device selects, as the final target value tcdf-4 of the light emission unit 23L-4, the smaller value of the first target value tcd1-4 and the third target value tcd3-4. In this example, the first target value tcd1-4 is a relatively great value (for example, "100"). Further, the third preceding vehicle OV3 exists in the irradiation area Ar4 of the light emission unit 23L-4, and the third target value tcd3-4 is thus a relatively small value (for example, "40"). Thus, the lighting device selects the third target value tcd3-4 as the final target value tcdf-4. In this case, the light emission unit 23L-4 irradiates the light at a relatively low emission intensity cd, and the light from the light emission unit 23L-4 thus does not reach the third reflection object RO3. Thus, the light from the light emission unit 23L-4 is not reflected by the third reflection object RO3, and the driver of the vehicle SV does not thus sense glare.

Further, in the third situation, the lighting device selects the second target value tcd2-*m* as the final target value tcdf-m of the light emission unit 23L-m. That is, the second control is prioritized over the first control. Thus, it is possible to reduce the possibility in that the driver of the preceding vehicle OV may sense glare.

The present disclosure is not limited to the one or more embodiments described above, and various modification examples can be adopted within the scope of the present disclosure.

Modification Example 1

When the current situation is the first situation, the lighting ECU 10 may determine the final target value tcdf-m as described below. The lighting control unit 1200 first selects, of the first target value tcd1-*m* and the second target value tcd2-*m*, a smaller target value (that is, the second target value tcd2-*m* when the second target value is prioritized). After that, the lighting control unit 1200 determines, as the final target value tcdf-m, a smaller one of the selected target value and the third target value tcd3-*m*.

Modification Example 2

Regarding the third control, the lighting ECU 10 may calculate an average brightness of pixels included in the pixel-of-interest area as in Japanese Patent No. 6744424. In this case, when the average brightness is equal to or higher than a predetermined threshold value, the lighting ECU 10 may determine that a reflection object exists in the pixel-of-interest area.

Modification Example 3

In the examples described above, the left high beam light 21L and the right high beam light 21R each include light emission units aligned in a single line in the vehicle width direction. The lighting device, however, is not limited thereto. The left high beam light 21L and the right high beam light 21R may each include light emission units aligned in a plurality of lines in the vehicle width direction.

What is claimed is:

1. A lighting device for a vehicle, comprising:
light emission units mounted in a front part of the vehicle and aligned in a predetermined direction;
a first sensor configured to acquire travel state information being information on a travel state of the vehicle;
a second sensor configured to acquire vehicle periphery information including information on an object existing in a peripheral region of the vehicle; and
an electronic control unit configured to execute a light distribution control of controlling an emission intensity of each of the light emission units to change an irradiation area formed of light irradiated from the light emission units,
wherein the light distribution control includes:
a first control of controlling the irradiation area in accordance with a traveling direction of the vehicle determined based on the travel state information;
a second control of controlling the irradiation area to reduce a degree of irradiation of the light to a position of an object detected based on the vehicle periphery information; and
a third control of controlling the irradiation area to reduce the degree of irradiation of the light to a position of a reflection object detected based on the vehicle periphery information,
wherein the electronic control unit is configured to:
select a final target value of the emission intensity from among a first target value being a target value of the emission intensity for executing the first control, a second target value being the target value of the emission intensity for executing the second control, and a third target value being the target value of the emission intensity for executing the third control; and
control the light emission units based on the final target value, and
wherein the electronic control unit is configured to select, as the final target value, a minimum value of the first target value, the second target value, and the third target value when a current situation is a first situation in which all of the first control, the second control, and the third control are to be executed.

2. The lighting device for the vehicle according to claim 1, wherein the electronic control unit is configured to select, as the final target value, a smaller value of the first target value and the third target value when the current situation is a second situation in which only the first control and the third control are to be executed.

3. The lighting device for the vehicle according to claim 1,
wherein the vehicle periphery information includes image data on the peripheral region, and
wherein, in the third control, when a brightness value of a pixel on the image data is equal to or greater than a predetermined brightness threshold value, the electronic control unit is configured to determine that the reflection object exists at a position corresponding to the pixel.

* * * * *